US011981004B2

(12) United States Patent
Zhang

(10) Patent No.: US 11,981,004 B2
(45) Date of Patent: May 14, 2024

(54) NAIL GUN

(71) Applicant: Huading Zhang, Taizhou (CN)

(72) Inventor: Huading Zhang, Taizhou (CN)

( * ) Notice: Subject to any disclaimer, the term of this patent is extended or adjusted under 35 U.S.C. 154(b) by 285 days.

(21) Appl. No.: 17/389,333

(22) Filed: Jul. 29, 2021

(65) Prior Publication Data

US 2021/0354276 A1 Nov. 18, 2021

Related U.S. Application Data

(63) Continuation of application No. PCT/CN2020/071177, filed on Jan. 9, 2020.

(30) Foreign Application Priority Data

Jan. 31, 2019 (CN) ......................... 201910099968.7

(51) Int. Cl.
*B25C 1/04* (2006.01)

(52) U.S. Cl.
CPC .................................... *B25C 1/047* (2013.01)

(58) Field of Classification Search
CPC .. B25C 1/047; B25C 1/04; B25C 1/06; B25C 1/008; B25C 1/041; B25C 1/043; B25C 1/08
See application file for complete search history.

(56) References Cited

U.S. PATENT DOCUMENTS 5,593,079 A 1/1997 Mukoyama et al.
7,182,236 B1 2/2007 Wen
11,065,748 B2 7/2021 Hung et al.
2009/0321495 A1* 12/2009 Hirabayashi .............. B25C 1/06 227/156
2018/0126528 A1* 5/2018 Pomeroy ................... B25C 5/13
2018/0215023 A1 8/2018 Taylor et al.

FOREIGN PATENT DOCUMENTS

CN 1662351 A 8/2005
CN 204736190 U 11/2015
CN 107206580 A 9/2017
CN 107717875 A 2/2018
CN 109605285 A 4/2019
CN 209533288 U 10/2019

* cited by examiner

*Primary Examiner* — Veronica Martin
(74) *Attorney, Agent, or Firm* — Au Law Office, P.C.; Yiu F. Au

(57) ABSTRACT

The present invention provides a nail gun, which belongs to the field of mechanical technologies, and solves a problem of how to prolong a service life of the nail gun. The nail gun comprises a housing and a driving arm capable, the housing is provided with a stopper and a locking block capable, the locking block is arranged between the stopper and the driving arm, and the locking block is respectively provided with a first locking portion and a second locking portion capable of being pawled in the driving arm; the stopper is capable of abutting against the first locking portion and preventing the locking block from moving relative to the housing to keep the second locking portion pawled with the driving arm, or the stopper is capable of releasing blocking so that the second locking portion is capable of moving and disengaging from the driving arm.

15 Claims, 7 Drawing Sheets

NAIL GUN

RELATED APPLICATIONS

This application is a continuation, under 35 U.S.C. 120, of International Patent Application No. PCT/CN2020/071177, filed Jan. 9, 2020, which claims priority to China Patent Application No. 201910099968.7, filed Jan. 31, 2019; each of the above-identified applications is herein hereby incorporated by reference.

BACKGROUND OF THE INVENTION

Field of Invention

The present invention belongs to the field of mechanical technologies, and relates to a nail gun.

Related Art

A nailer, also known as a nail gun, is widely used in the decoration industry. According to different driving sources, the nail guns may be divided into electric nail guns, pneumatic nail guns, gas nail guns, manual nail guns, and the like. The pneumatic nail guns use an air pressure generated by an air pump as a power source to generate high air pressure to push a driving ram in a cylinder of the pneumatic nail gun to perform a hammering motion, so that nails in a cartridge clip are nailed into an object or the nails are shot out.

Specifically, a structure of the pneumatic nail gun comprises a gun body, an air cylinder, a balance valve, a switch assembly, a driving ram assembly, a locking mechanism for locking the driving ram, a cushion, a gun nozzle, a gun recess, etc. For example, the nailer with the Chinese patent application number 201520454838.8 comprises a closed first cylinder, and a closed second cylinder disposed outside the first cylinder, a working chamber of the first cylinder and a working chamber of the second cylinder are in communication with each other, a first piston is arranged inside the first cylinder, and the first piston is fixedly connected with a driving ram, and the driving ram has a limiter. The nailer further comprises a pawl, a second piston is arranged inside the second cylinder, and the second piston is driven by a motor to move reciprocatively between a first position and a second position of the second cylinder. When the second piston is at the first position, the first piston is moved inwardly and then pawled with the limiter of the driving ram by the pawl. When the second piston is at the second position, the motor drives the pawl to disengage from the limiter. The present invention can drive the second piston to compress air through the motor, and actuate the pawl through the motor to achieve fast and continuous firing of the nails, has a compact structure, and is stable and reliable.

However, according to the analysis of the above patent document, when the motor actuates the pawl to unlock the driving ram, in this case, the driving ram is pushed by the air pressure, which may generate a great friction with the pawl in an unlocking process, so that a contact position between the pawl and the driving ram is easily worn and affected by a width of the driving ram, and a recess here should not be designed too deeply. Therefore, after the existing nailer is used for a period of time, it is easy to cause the problem of locking failure, so that the pawl, the driving ram and other parts of the nailer need to be repaired and replaced, or even directly discarded. That is to say, the above factors seriously affect the service life of the nailer. In the prior art, in order to prolong the service life, there are generally two conventional methods easily thought of by those skilled in the art. One is to increase the wear resistance of the locking mechanism to prolong the service life, and the other is to design a plurality of joint locking points. On one hand, a stress at the joint is dispersed; on the other hand, even if one joint locking point fails, the other joint locking point can still work for a period of time, so as to improve the service life of the nailer.

SUMMARY OF THE INVENTION

An objective of the present invention is to provide a nail gun aiming at the above problems in the prior art. A technical problem solved by the present invention is how to improve a service life of the service life.

The objective of the present invention may be achieved by the following technical solutions. A nail gun comprises a housing and a driving arm reciprocating relative to the housing, and the driving arm is provided with a recess, wherein the housing is provided with a stopper and a locking block capable of moving relative to the housing, the locking block is located between the stopper and the driving arm, the locking block is capable of abutting against the driving arm under the action of a return spring, and the locking block is respectively provided with a first locking portion and a second locking portion capable of being pawled in the driving arm; when the stopper moves and blocks the first locking portion, the second locking portion is pawled in the recess of the driving arm so that the second locking portion keeps being pawled with the driving arm; and when the stopper moves backward to disengage from the first locking portion, the second locking portion is pushed by the driving arm and disengaged from the recess of the driving arm.

Different from the conventional technical means in the prior art that the service life of the nail gun is prolonged by increasing the wear resistance of the stopper and the driving arm or increasing a quantity of joint locking points, the present invention changes the position of the joint locking points above and transfers the position of the joint locking point with maximum friction stress and easy to wear to the position between the locking block with a larger locking design space and the stopper, so that wear to the driving arm is reduced fundamentally, locking failure of the driving arm is avoided, and the service life of the nail gun is greatly prolonged. The specific working principle of the nail guan is as follows: according to the present invention, the first locking portion and the second locking portion are respectively designed on the locking block. When the driving arm is in a locked state, the locking block is pawled on the driving arm through the second locking portion in this case. Because the driving arm is driven by an air pressure or a magnetic force or other driving force, the locking block has a movement trend of moving relative to the housing. In this case, the stopper contacts with and abuts against the first locking portion, thus blocking the locking block from moving relative to the housing, and thus locking the driving arm. In the locked state above, there is static friction between the first locking portion and the stopper, and between the second locking portion and the driving arm, and no wear will occur in this case. When the driving arm is in an unlocked state, it is necessary to control the stopper to release the blocking of the locking block, so that the locking block can move relative to the housing under the pushing of the driving arm, thereby releasing a pawl relationship with the driving arm and unlocking the driving arm. By analyzing the above unlocking process, it can be known that the locking relationship between the stopper and the locking block needs to be released first, that is, in the present invention, the joint locking point with the maximum friction stress is actually located between the stopper and the first locking portion of the locking block. When this joint locking point is unlocked, most of the energy exerted by the driving arm on the locking block is released through the mutual friction between the first locking portion and the stopper, so that when the second locking portion on the locking block and the driving arm are unlocked, the friction work between the two is very small, thus greatly reducing the wear of the driving arm in the unlocking process, so that the locking of the driving arm can be effectively maintained for a long time. Meanwhile, compared with the limited design space of the locking structure caused by the technical requirements such as the design size of the driving arm, it is obvious that the design space of the locking structure formed by the stopper and the locking block is larger, so that even if the wear is transferred therebetween, the two can maintain effective locking for a long time. Therefore, through the above design, the nail gun can be used for a long time, and the service life of the nail gun is greatly prolonged.

In the nail gun above, the locking block is rotatably connected to the housing, and the first locking portion has a backstop surface, and when the second locking portion is disengaged from the driving arm, the stopper is capable of abutting against the backstop surface and keeping a gap between the locking block and the driving arm. With the design above, when the second locking portion is disengaged from the driving arm, the driving arm will not contact with the first locking portion when moving under the action of a driving force, thus further reducing the wear on the driving arm, and enabling the driving arm to be used for a long time, thus further prolonging the service life of the nail gun.

In the nail gun above, the locking block is block-shaped, the first locking portion is a bulge protruding outwards relative to a body of the locking block, the backstop surface is located at an inner side of the first locking portion, an outer side of the first locking portion is provided with an abutting surface, the stopper is rotatably connected to the housing, and the stopper is provided with a hook-shaped locking hook portion; an inner side of the locking hook portion is provided with a first blocking surface, the first blocking surface is capable of contacting with and abutting against the abutting surface, an outer side of the locking hook portion is provided with a second blocking surface, and the second blocking surface is capable of contacting with and abutting against the backstop surface. When the first blocking surface abuts against the abutting surface, the driving arm is in a locked state. When the second blocking surface abuts against the backstop surface, the driving arm is in an unlocked state. Through the rotation design of the above stopper, due to the large structure design space of the stopper, and with the utilization of the design of the locking hook portion, i.e., the design of the first blocking surface and the second blocking surface, the stopper can reliably lock the locking block, and the whole mechanism structure is stable, which is beneficial to prolonging the service life of the nail gun.

In the nail gun, the locking block is capable of rotating relative to the housing so that the second locking portion is pawled into or disengaged from the recess. When the second locking portion is pawled on the driving arm, the stopper can contact with and abut against the first locking portion and block the locking block from rotating relative to the housing, so as to lock the driving arm. When the stopper releases the blocking, in this case, the locking block rotates relative to the housing under the pushing of the driving arm, so that the second locking portion is disengaged from the recess, thereby unlocking the driving arm. Through the design of the recess above, the locking block can reliably lock the driving arm, and a rotary connection design is employed in the locking block, so that the locking block moves stably in the use process, thus ensuring the reliability of the locking structure of the driving arm, and further contributing to prolonging the service life of the nail gun.

In the nail gun above, when the second locking portion is pawled on the driving arm, a rotation center of the locking block is located between recess walls at both sides of the recess. According to the stress analysis of the second locking portion, the force exerted by the driving arm on the second locking portion may be divided into a radial component and a circumferential component. Through the above design on the position of the rotation center of the locking block, the second locking portion bears a large circumferential component and a small radial component, which makes the second locking portion rotate out of the groove more easily and smoothly, thus being beneficial to reducing the wear generated when the second locking portion and the driving arm are released from a pawl relationship, and further improving the service life of the nail gun.

In the nail gun above, the second locking portion is a bulge protruding outwards relative to the body of the locking block, and a yielding surface is formed on the recess wall at one side of the recess near a front end of the driving arm, the yielding surface is an arc surface or an inclined surface, a straight surface extending along a width direction of the driving arm is formed on one the recess wall at one side of the recess near a rear end of the driving arm, and an acting surface capable of abutting against the straight surface is formed on one side of the second locking portion near the straight surface. Through the above design of the recess walls at both sides of the recess and the acting surface on the second locking portion, the wear of the second locking portion in the process of rotating and disengaging from the recess can be reduced, thus being beneficial to prolonging the service life of the nail gun.

In the nail gun above, the locking block is reset by a torsion spring, the housing is pierced and rotatably connected with a rotating shaft, the locking block is fixed at one end of the rotating shaft, the other end of the rotating shaft is fixed with a bracket, the torsion spring is sleeved on the rotating shaft, one end of the torsion spring is fixed on the bracket, and the other end of the torsion spring abuts against the housing. With the reset mechanism designed above, when the driving arm retreats, the second locking portion of the locking block will be pawled back to the driving arm under the elastic force of the torsion spring, and then the stopper will contact with and abut against the first locking portion of the locking block again, thus realizing resetting the locking block.

In the nail gun above, the stopper is rotatably connected to the housing through a first pivot, and a toggle member is fixedly connected to the first pivot. Through the design of the toggle member above, when the stopper abuts against the backstop surface, the abutment of the stopper against the backstop surface can be released by pushing the toggle member, so that the locking block can move relative to the housing.

As another solution, in the nail gun above, the locking block is slidingly connected to the housing, the driving arm is provided with the recess, and the locking block is capable of sliding relative to the housing so that the second locking portion is pawled into or disengaged from the recess. When the second locking portion is pawled on the driving arm, the stopper can contact with and abut against the first locking portion and block the locking block from sliding relative to the housing, so as to lock the driving arm. When the stopper releases the blocking, in this case, the locking block slides relative to the housing under the pushing of the driving arm, so that the second locking portion is disengaged from the recess, thereby unlocking the driving arm. Through the design above, the locking block can reliably lock the driving arm.

In the nail gun above, the housing is provided with a chute, the stopper is located at one side of the chute and is rotatably connected with the housing, the driving arm is located at the other side of the chute, the chute is obliquely relative to an advancing direction of the driving arm, and the locking block is slidingly connected in the chute. Through the arrangement design of the stopper, the chute and the driving arm above, when the stopper rotates to release the blocking of the locking block, the locking block slides along the chute under the pushing of the driving arm. Because the chute is inclined relative to the advancing direction of the driving arm, the second locking portion of the locking block can be quickly disengaged from the recess, which is beneficial to reducing the wear generated when the second locking portion and the driving arm are released from a pawl relationship, and further beneficial to prolonging the service life of the nail gun.

In the nail gun above, the locking block is reset by a torsion spring, the torsion spring is sleeved on the housing, the locking block is provided with a boss, the boss is provided with an annular groove, one end of the torsion spring abuts against the annular groove, and the other end of the torsion spring abuts against the housing. With the reset mechanism designed above, when the driving arm retreats, the second locking portion of the locking block will be pawled back to the driving arm under the elastic force of the torsion spring, and then the stopper will contact with and abut against the first locking portion of the locking block again, thus realizing resetting the locking block.

Compared with the prior art, the nail gun has the following advantages: according to the nail gun, the locking block is designed between the stopper and the driving arm, which transfers the position of the joint locking point with the maximum friction stress and easy to wear to the position between the locking block with a larger locking design space and the stopper, so that wear to the driving arm is reduced fundamentally, locking failure of the driving arm is avoided, and the service life of the nail gun is greatly prolonged.

DETAILED DESCRIPTION OF THE INVENTION

The technical solutions of the present invention are further described below with reference to the specific embodiments of the present invention in conjunction with the accompanied drawings, but the present invention is not limited to the embodiments.

First Embodiment

Figure 1:
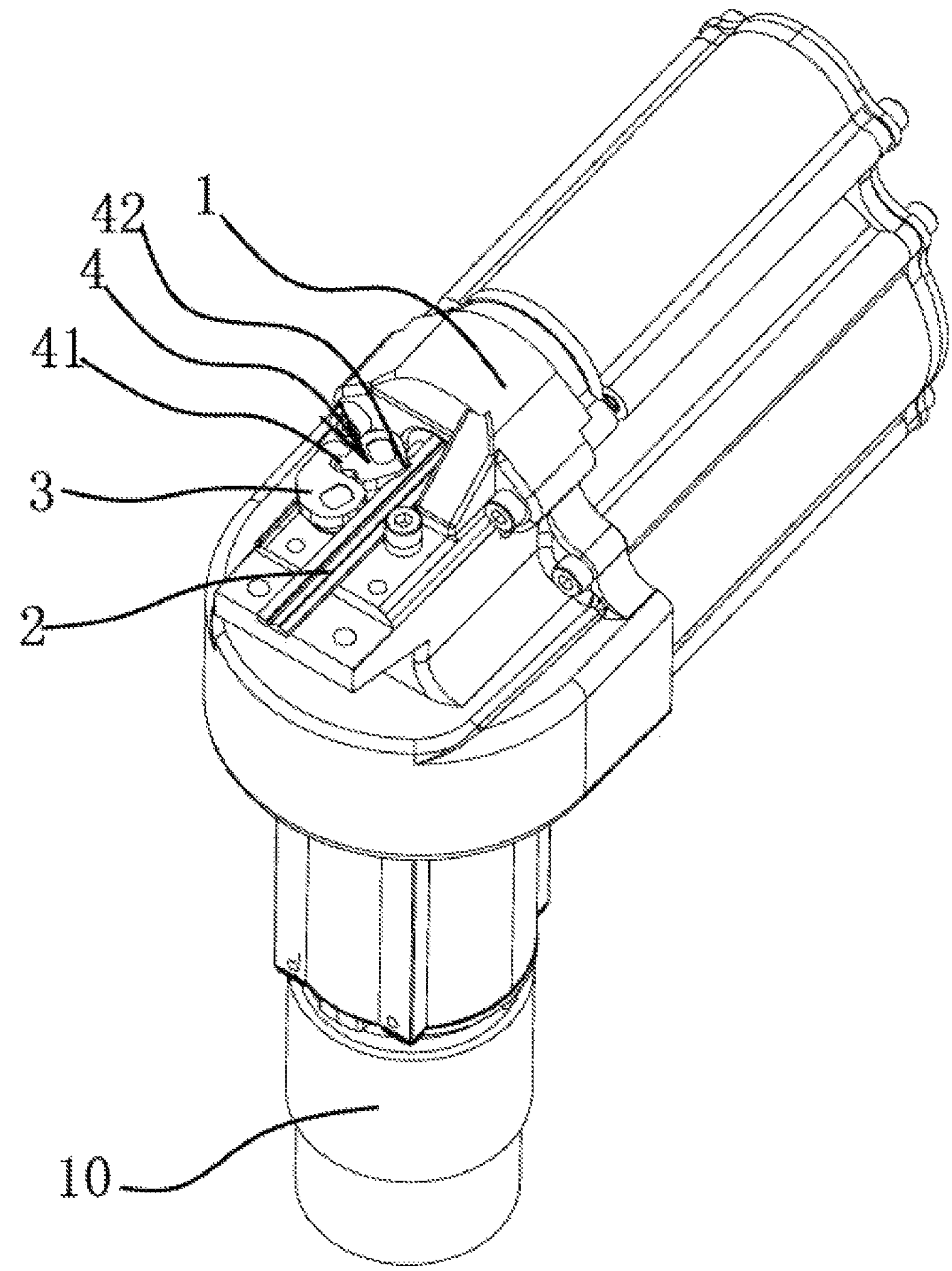
FIG. 1 is a schematic diagram of a partial structure of a nail gun according to a first embodiment of the present invention.
Figure 2:
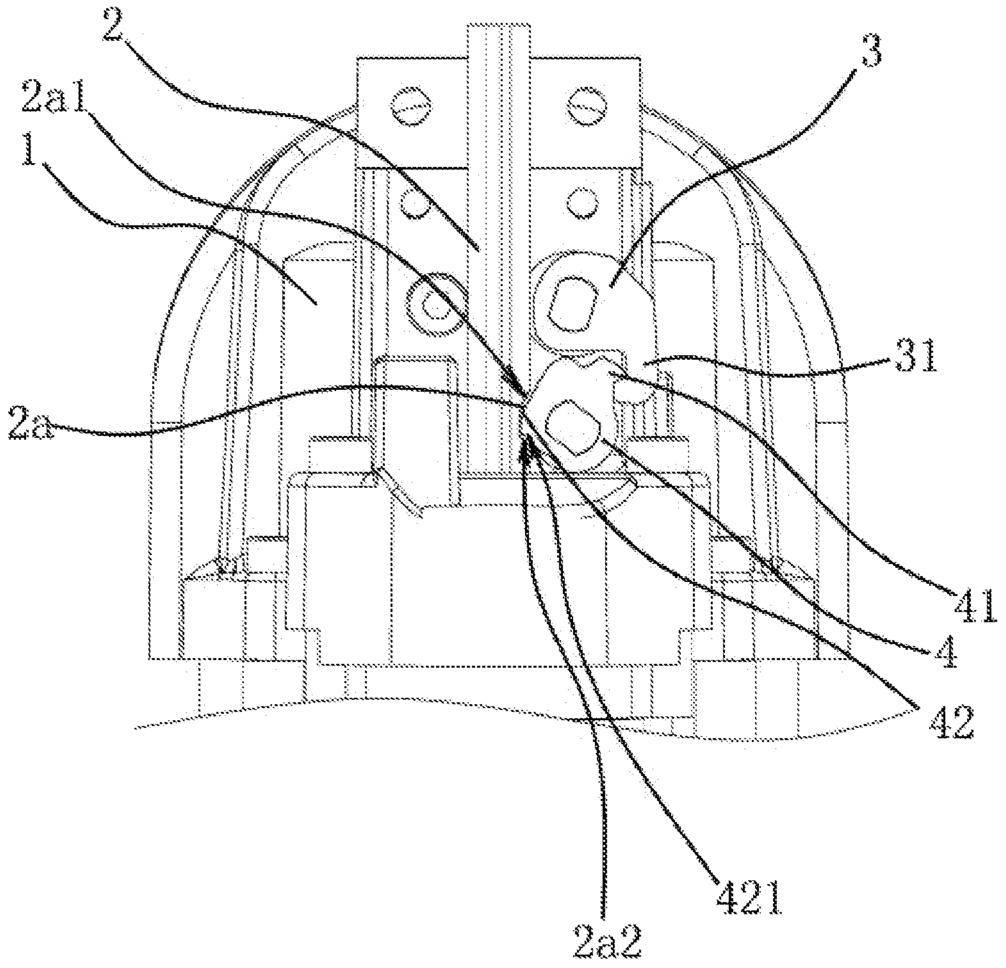
FIG. 2 is a schematic structural diagram when a driving arm is in a locked state according to the first embodiment.
Figure 3:
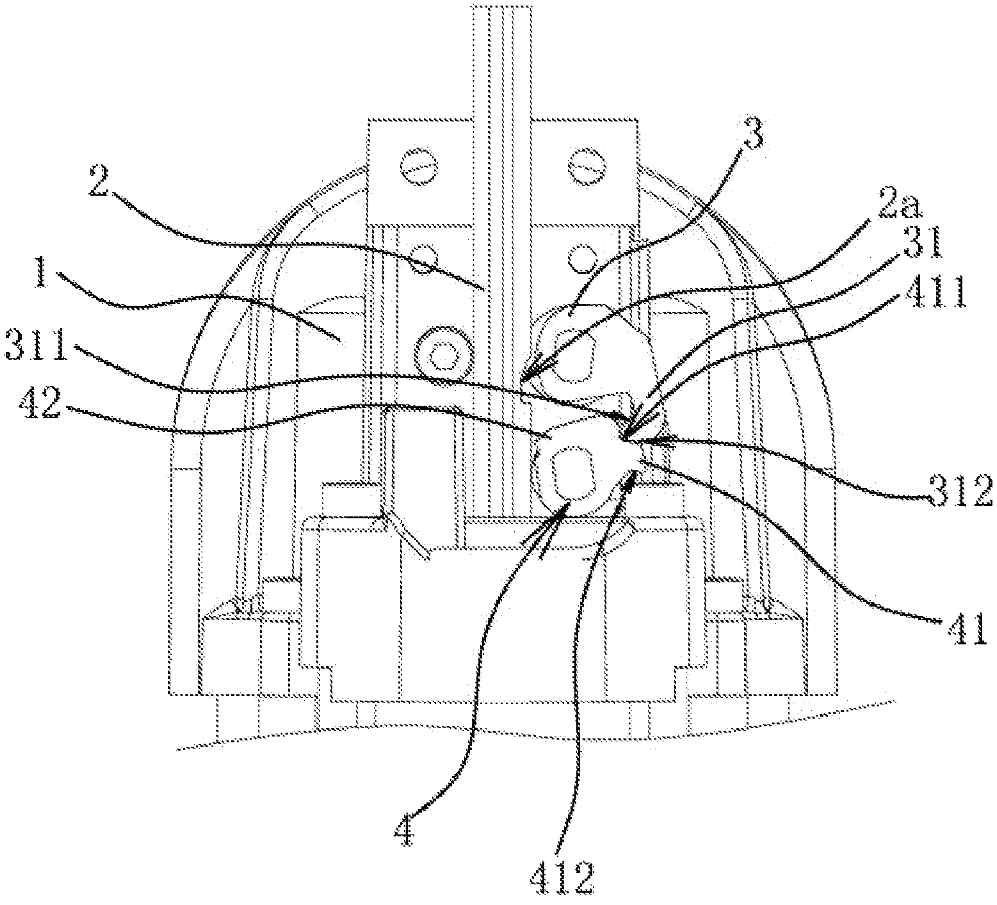
FIG. 3 is a schematic structural diagram when the driving arm is in an unlocked state according to the first embodiment.

Specifically, as shown in FIG. 1, the nail gun comprises a housing 1 and a driving arm 2 capable of reciprocating relative to the housing 1 and provided with a recess **2*a* at one side. Moreover, the housing 1 is rotatably provided with a stopper 3. A locking block 4 is arranged between the stopper 3 and the driving arm 2, and the locking block 4 is rotatably connected to the housing 1. Meanwhile, the locking block 4 is respectively provided with a first locking portion 41 and a second locking portion 42. The locking block is capable of rotating relative to the housing 1, so that the second locking portion 42 is pawled into or disengaged from the recess 2*a* above. As shown in FIG. 2, when the driving arm 2 is in a locked state, the locking block 4 is pawled in the recess 2*a* of the driving arm 2 through the second locking portion 42 and has a movement trend of moving relative to the housing 1. The stopper 3 is capable of abutting against the first locking portion 41 and blocking the locking block from moving relative to the housing 1. As shown in FIG. 3, when the driving arm 2 is in an unlocked state, that is, when the stopper 3 releases the blocking of the locking block 4, the locking block 4 is capable of rotating relative to the housing 1 and releasing a locking relationship with the driving arm 2 under the pushing of the driving arm 2. In this case, the second locking portion 2 42 is disengaged from the recess 2*a*. The first locking portion 41 has a backstop surface 411, and the stopper 3 abuts against the backstop surface 411 to keep a gap between the locking block 4 and the driving arm 2. The driving arm 2** is capable of moving forwards under the action of a driving force.

More specifically, as shown in FIG. 2 and FIG. 3, the stopper 3 is provided with a hook-shaped locking hook portion 31; an inner side of the locking hook portion 31 is provided with a first blocking surface 311, and an outer side of the locking hook portion 31 is provided with a second blocking surface 312. The locking block 4 is block-shaped, the first locking portion 41 and the second locking portion 42 are respectively a bulge protruding outwards relative to a body of the locking block 4, the backstop surface 411 is located at an inner side of the first locking portion 41, an outer side of the first locking portion 41 is provided with an abutting surface 412, the first blocking surface 311 is capable of contacting with and abutting against the abutting surface 412, and the second blocking surface 312 is capable of contacting with and abutting against the backstop surface 411. Meanwhile, a yielding surface **2*a*1 is formed on the recess wall at one side of the recess 2*a* near a front end of the driving arm 2, the yielding surface 2*a*1 is an arc surface or an inclined surface, a straight surface 2*a*2 extending along a width direction of the driving arm 2 is formed on one the recess wall at one side of the recess 2*a* near a rear end of the driving arm 2, and an acting surface 421 capable of abutting against the straight surface 2*a*2 is formed on one side of the second locking portion 42 near the straight surface 2*a*2. In addition, when the second locking portion 42 is pawled on the driving arm 2, a rotation center of the locking block 4 is located between recess walls at both sides of the recess 2***a*.

Figure 4:
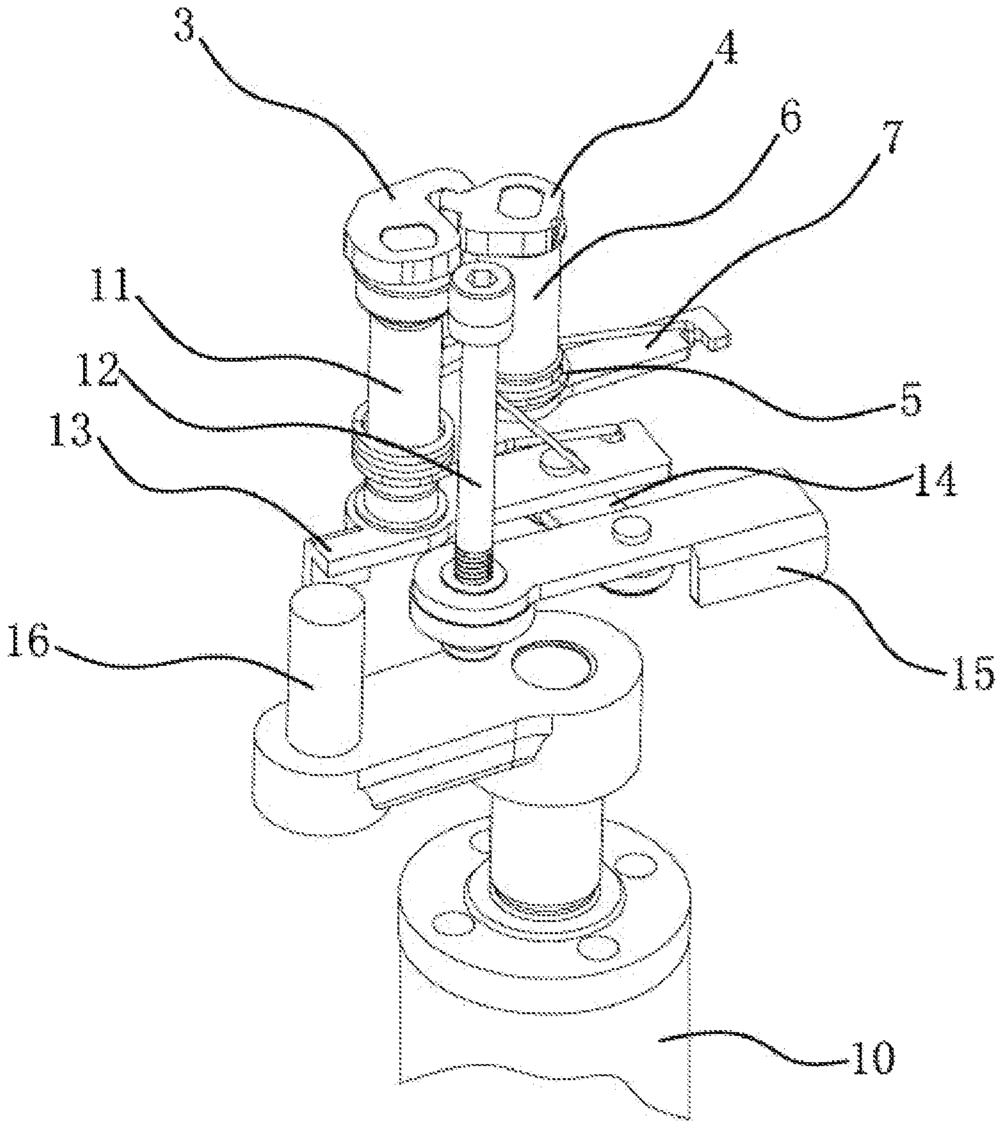
FIG. 4 is a schematic diagram of a driving mechanism for a stopper and a locking block according to the first embodiment.

More specifically, as shown in FIG. 4, in this embodiment, the locking block 4 is reset by a torsion spring 5, the housing 1 is pierced and rotatably connected with a rotating shaft 6, the locking block 4 is fixed at one end of the rotating shaft 6, the other end of the rotating shaft 6 is fixed with a bracket 7, the torsion spring 5 is sleeved on the rotating shaft 6, one end of the torsion spring 5 is fixed on the bracket 7, and the other end of the torsion spring abuts against the housing 1.

Moreover, a driving structure for driving the stopper 3 to rotate in the present invention comprises a motor 10, a hinge rod 16 fixedly connected with a motor shaft of the motor 10, a first pivot 11, a second pivot 12, a toggle member 13, a connecting plate 14 and a toggle block 15. The stopper 3 is connected to the housing 1 through the first pivot 11, the housing 1 is also provided with the second pivot 12. The first pivot 11 is fixedly connected the toggle member 13, and the first pivot 11 is also provided with the torsion spring for restoring the stopper 3. The second pivot 12 is fixedly connected with the toggle block 15, the connecting plate 14 is arranged between the toggle block 15 and the toggle member 13, and two ends of the connecting plate 14 are respectively hinged with the toggle block 15 and the toggle member 13. The toggle block 15 can abut against the hinge rod 16, and the toggle member 13 can also abut against the hinge rod 16. The hinge rod is driven by the direct current motor 10 to rotate. When the hinge rod 16 rotates to a position of the toggle block 15, the hinge rod can trigger the toggle block 15 to drive the stopper 3 to rotate. In this time, the stopper 3 can release the blocking of the locking block 4, so that the locking block 4 rotates relative to the housing 1 under the pushing of the driving arm 2 and disengages from the driving arm 2 against an elastic force of the torsion spring 5 until the second blocking surface 312 on the stopper 3 contacts with and abuts against the backstop surface 411 on the locking block 4. In this way, the locking block 4 and the driving arm 2 keep a gap and do not contact, so as to realize the unlocking operation. When the motor 10 drives the hinge rod 16 to continue to rotate and rotate to a position of the toggle member 13, the toggle member 13 drives the stopper 3 to rotate again, so that the stopper 3 releases the abutment against the backstop surface 411 and the driving arm 2 retreats simultaneously. In this case, the locking block 4 is reset under the action of the torsion spring 5, and the driving arm 2 is re-pawled, thereby realizing re-locking.

Second Embodiment

Figure 5:
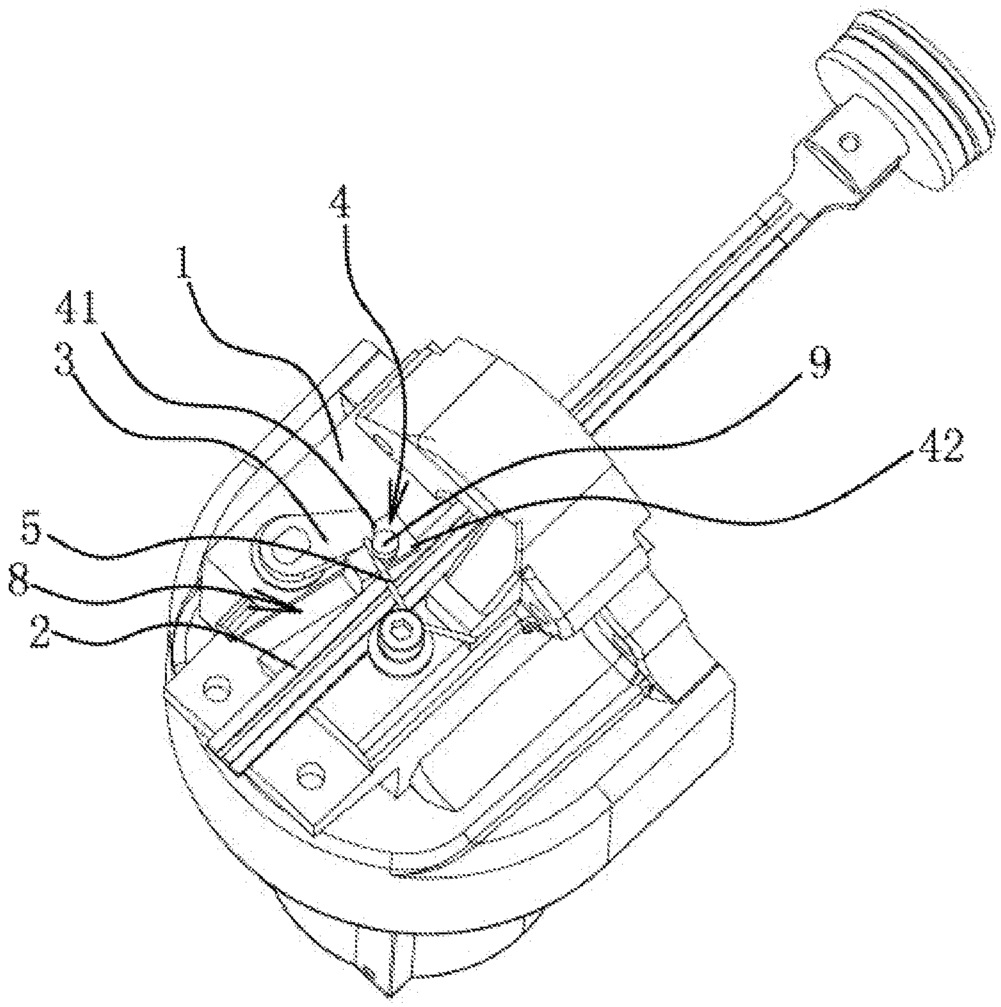
FIG. 5 is a schematic structural diagram when a driving arm is in a locked state according to a second embodiment.
Figure 6:
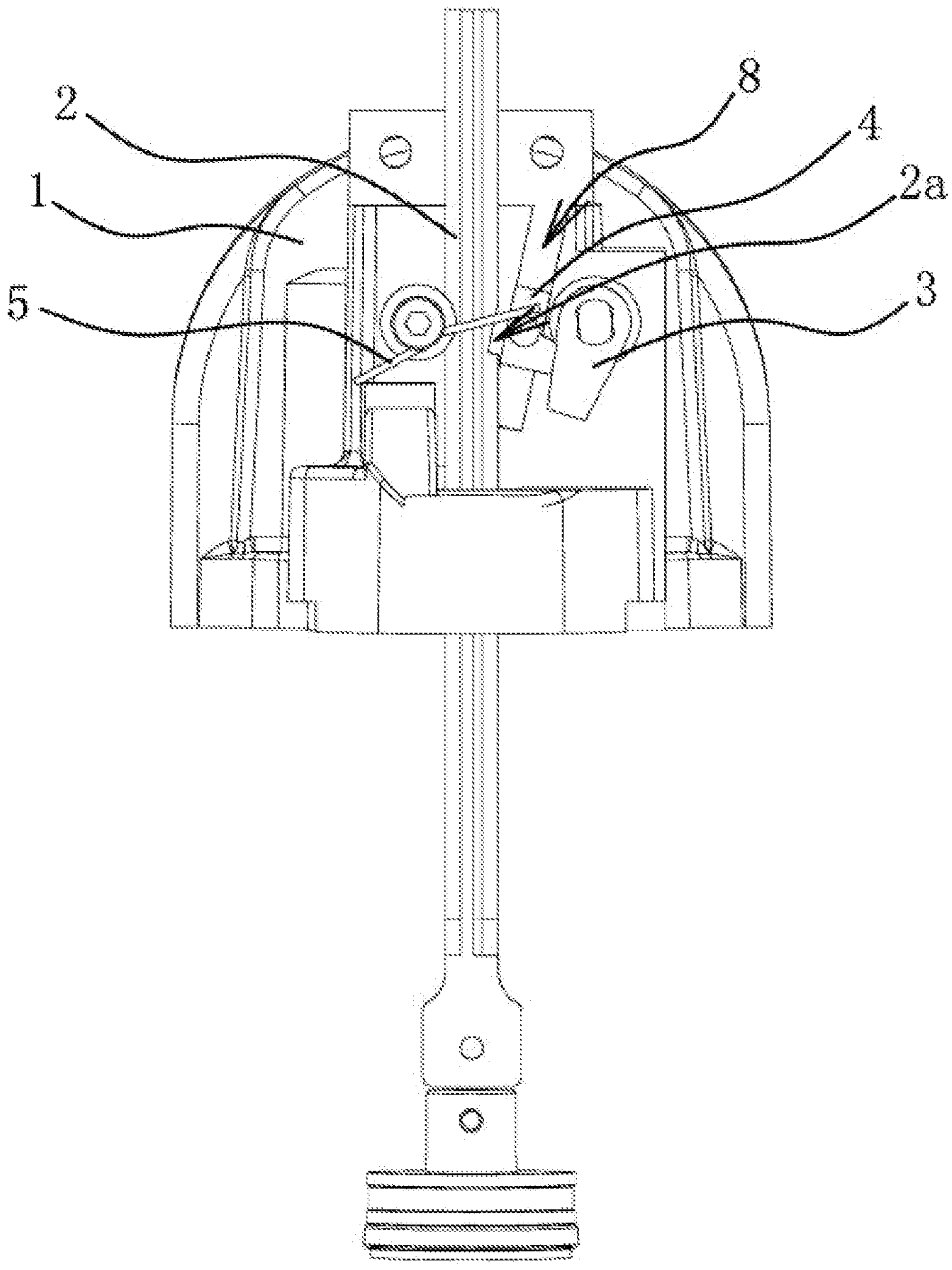
FIG. 6 is a schematic structural diagram when the driving arm is in an unlocked state according to the second embodiment.
Figure 7:
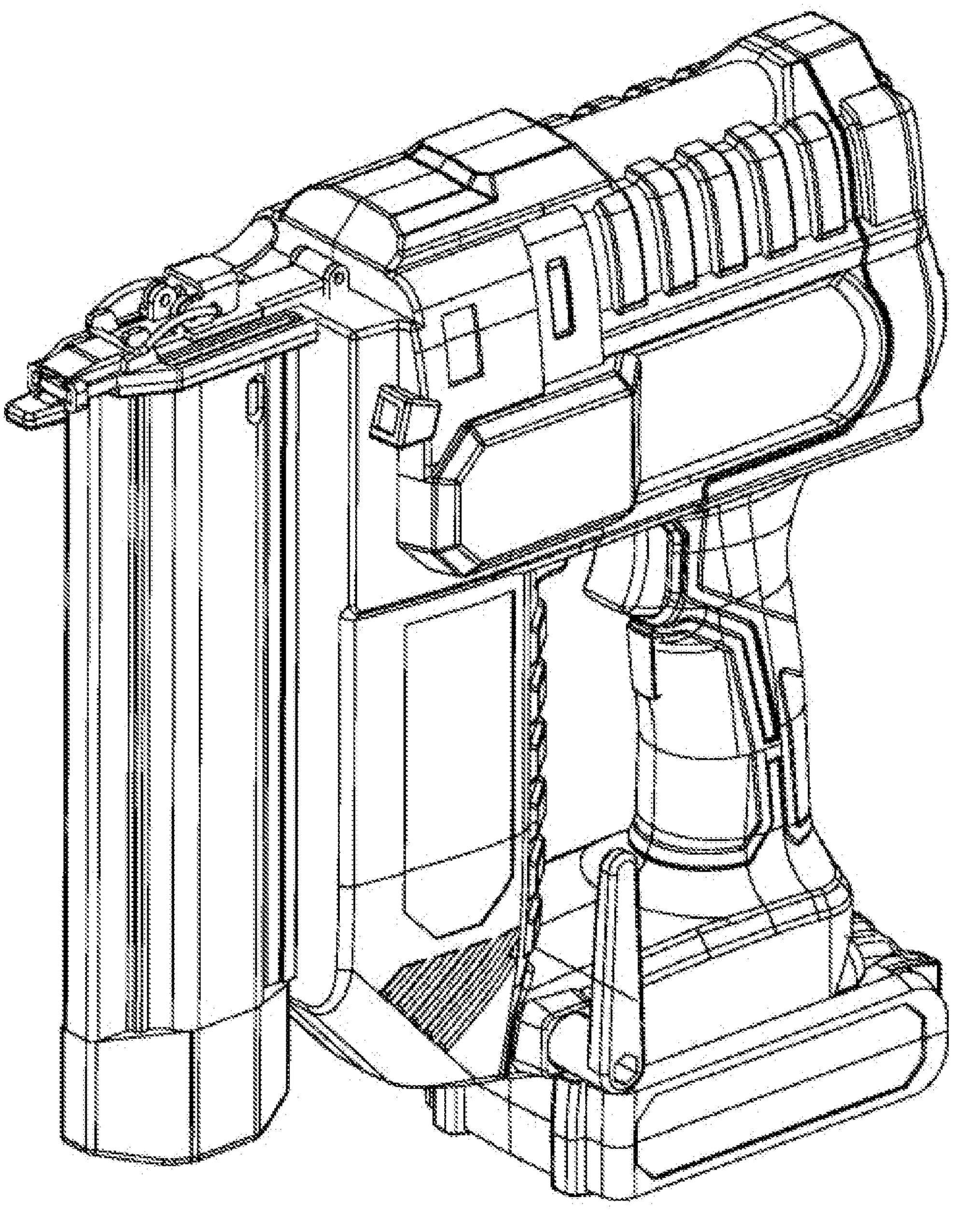
FIG. 7 is a schematic diagram of an overall structure of the nail gun.

The second embodiment has basically the same structure and principle as the first embodiment, and the differences are shown in FIG. 5 and FIG. 6. In this embodiment, the housing 1 is provided with a chute 8, the chute 8 is obliquely relative to an advancing direction of the driving arm 2, the stopper 3 is located at one side of the chute 8 and is rotatably connected with the housing 1, and the driving arm is located at the other side of the chute 8. The locking block 4 is slidingly connected in the chute 8, and the locking block 4 is capable of sliding relative to the housing 1, so that the second locking portion 42 is pawled into or disengaged from the recess 2*a* above. The locking block 4 is reset by a torsion spring 5, the torsion spring 5 is sleeved on the housing 1, the locking block 4 is provided with a boss 9, the boss 9 is provided with an annular groove, one end of the torsion spring 5 abuts against the annular groove and the other end of the torsion spring 5 abuts against the housing. When the second locking portion 42 is pawled on the driving arm 2, the stopper 3 can contact with and abut against the first locking portion 41 and block the locking block 4 from sliding relative to the housing 1, so as to lock the driving arm 2. When the stopper 3 releases the blocking, in this case, the locking block 4 slides relative to the housing 1 under the pushing of the driving arm 2, so that the second locking portion 42 is disengaged from the recess 2*a*, thereby unlocking the driving arm 2. Meanwhile, in this embodiment, the toggle member 13 is not designed with a position for toggle, and is a common connecting rod structure. Driven by the motor 10, the hinge rod 16 can trigger the toggle block 15 once every rotation to realize unlocking operation.

The specific embodiments described herein are merely illustrative of the spirit of the present invention. Those skilled in the art of the present invention can make various modifications or additions to the specific embodiments described or replace them in a similar manner, without departing from the spirit of the present invention or beyond the scope defined by the appended claims.

Although the technical terms housing 1, driving arm 2, recess 2*a*, yielding surface 2*a*1, straight surface 2*a*2, stopper 3, locking hook portion 31, first blocking surface 311, second blocking surface 312, locking block 4, first locking portion 41, backstop surface 411, abutting surface 412, second locking portion 42, acting surface 421, torsion spring 5, rotating shaft 6, stent 7, chute 8, boss 9, motor 10, first pivot 11, second pivot 12, toggle member 13, connecting plate 14, toggle block —15 and hinge rod 16 are used more frequently herein, the possibility of using other technical terms is not excluded. These technical terms are merely used to describe and explain the nature of the present invention more conveniently; and construing them as any additional limitation is contrary to the spirit of the present invention.

LIST OF REFERENCE NUMERALS

1 housing
2 driving arm
2*a* recess
2*a*1 yielding surface
2*a*2 straight surface
3 stopper
31 locking hook portion
311 first blocking surface
312 second blocking surface
4 locking block
41 first locking portion
411 backstop surface
412 abutting surface
42 second locking portion
421 acting surface
5 torsion spring
6 rotating shaft
7 bracket
8 chute
9 boss
10 motor
11 first pivot
12 second pivot
13 toggle member
14 connecting plate
15 toggle block
16 hinge rod

What is claimed is:

1. A nail gun, comprising a housing, a driving arm, reciprocating relative to the housing, a stopper, connected with the housing, a locking block element with a first locking portion and a second locking portion, arranged between the stopper and the driving arm and capable of moving relative to the housing, a return spring, the locking block element capable of abutting against the driving arm under the action of the return spring, wherein when the stopper moves to block the first locking portion of the locking block element, the second locking portion of the locking block element locks the driving arm to stop the driving arm reciprocating; and wherein when the stopper moves backward to disengage from the first locking portion of the locking block element, the second locking portion of the locking block element is pushed by the driving arm to be disengaged from the driving arm.

2. The nail gun of claim 1, wherein the locking block element is rotatably connected to the housing, the first locking portion has a backstop surface, and when the second locking portion is disengaged from the driving arm, the stopper is capable of abutting against the backstop surface and keeping a gap between the locking block element and the driving arm.

3. The nail gun of claim 2, wherein the locking block element is block-shaped, the first locking portion is a bulge protruding outwards relative to a body of the locking block element, the backstop surface is located at an inner side of the first locking portion, an outer side of the first locking portion is provided with an abutting surface, the stopper is rotatably connected to the housing, and the stopper is provided with a hook-shaped locking hook portion; an inner side of the locking hook portion is provided with a first blocking surface, the first blocking surface is capable of contacting with and abutting against the abutting surface, an outer side of the locking hook portion is provided with a second blocking surface, and the second blocking surface is capable of contacting with and abutting against the backstop surface.

4. The nail gun of claim 1, wherein the locking block element is capable of rotating relative to the housing so that the second locking portion is pawled into or disengaged from the recess.

5. The nail gun of claim 4, wherein when the second locking portion is pawled on the driving arm, a rotation center of the locking block element is located between recess walls at both sides of the recess.

6. The nail gun of claim 4, wherein the second locking portion is a bulge protruding outwards relative to the body of the locking block element, and a yielding surface is formed on the recess wall at one side of the recess near a front end of the driving arm, the yielding surface is an arc surface or an inclined surface; a straight surface extending along a width direction of the driving arm is formed on one the recess wall at one side of the recess near a rear end of the driving arm, and an acting surface capable of abutting against the straight surface is formed on one side of the second locking portion near the straight surface.

7. The nail gun of claim 1, wherein the locking block element is reset by a torsion spring, the housing is pierced and rotatably connected with a rotating shaft, the locking block element is fixed at one end of the rotating shaft, the other end of the rotating shaft is fixed with a bracket, the torsion spring is sleeved on the rotating shaft, one end of the torsion spring is fixed on the bracket, and the other end of the torsion spring abuts against the housing.

8. The nail gun of claim 2, wherein the stopper is rotatably connected to the housing through a first pivot, and a toggle member is fixedly connected to the first pivot.

9. The nail gun of claim 1, wherein the locking block element is slidingly connected to the housing, the driving arm is provided with the recess, and the locking block element is capable of sliding relative to the housing so that the second locking portion is pawled into or disengaged from the recess.

10. The nail gun of claim 9, wherein the housing is provided with a chute, the stopper is located at one side of the chute and is rotatably connected with the housing, and the driving arm is located at the other side of the chute, the chute is obliquely relative to an advancing direction of the driving arm; the locking block element is slidingly connected in the chute;

the locking block element is reset by a torsion spring, the torsion spring is sleeved on the housing, the locking block element is provided with a boss, the boss is provided with an annular groove, one end of the torsion spring abuts against the annular groove, and the other end of the torsion spring abuts against the housing.

11. The nail gun of claim 2, wherein the locking block element is capable of rotating relative to the housing so that the second locking portion is pawled into or disengaged from the recess.

12. The nail gun of claim 3, wherein the locking block element is capable of rotating relative to the housing so that the second locking portion is pawled into or disengaged from the recess.

13. The nail gun of claim 2, wherein the locking block element is reset by a torsion spring, the housing is pierced and rotatably connected with a rotating shaft, the locking block element is fixed at one end of the rotating shaft, the other end of the rotating shaft is fixed with a bracket, the torsion spring is sleeved on the rotating shaft, one end of the torsion spring is fixed on the bracket, and the other end of the torsion spring abuts against the housing.

14. The nail gun of claim 3, wherein the locking block element is reset by a torsion spring, the housing is pierced and rotatably connected with a rotating shaft, the locking block element is fixed at one end of the rotating shaft, the other end of the rotating shaft is fixed with a bracket, the torsion spring is sleeved on the rotating shaft, one end of the torsion spring is fixed on the bracket, and the other end of the torsion spring abuts against the housing.

15. The nail gun of claim 1, wherein the first locking portion is outwardly convex or inwardly concave and the second locking portion is outwardly convex.

* * * * *